(12) United States Patent
Tanji

(10) Patent No.: US 6,910,653 B2
(45) Date of Patent: Jun. 28, 2005

(54) SEAT BELT RETRACTOR

(75) Inventor: Hiromasa Tanji, Shiga (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 10/248,182

(22) Filed: Dec. 24, 2002

(65) Prior Publication Data

US 2003/0122020 A1 Jul. 3, 2003

(30) Foreign Application Priority Data

Dec. 27, 2001 (JP) .................................. 2001-396614

(51) Int. Cl.$^7$ .................................................. B60R 22/46
(52) U.S. Cl. ................ 242/390.8; 242/374; 242/379.1; 242/382.2; 280/806; 297/478
(58) Field of Search .......................... 242/390.8–390.9, 242/374, 379.1, 382.2; 297/478

(56) References Cited

U.S. PATENT DOCUMENTS 3,219,297 A    11/1965  Kenyon
6,499,554 B1 * 12/2002  Yano et al. ................. 180/268

2002/0096591 A1   7/2002  Tanji

FOREIGN PATENT DOCUMENTS

DE    43 42 666 A1    6/1995
DE    200 13 541 U1   10/2000
JP    2002-326558 A   11/2002

* cited by examiner

Primary Examiner—Kathy Matecki
Assistant Examiner—Sang Kim
(74) Attorney, Agent, or Firm—Foley & Lardner LLP

(57) ABSTRACT

A seat belt retractor having a force limiter mechanism that can be stably operated when a pyrotechnic pretensioner is activated. As a pyrotechnic pretensioner is activated, a ring gear rotates in the counter-clockwise direction. Accordingly, an external tooth holding an end portion of a stopper is moved, whereby the end portion of the stopper becomes free. Therefore, the stopper expands because of its biasing force. Then, a release spring is released from the restriction of the stopper and thus pivots in the clockwise direction because of its biasing force. The release spring collides with a pin of the clutch pawl to press down the pin. Therefore, the clutch pawl is rotated about a clutch pawl pin in the clockwise direction, thereby canceling the mechanical connection between the motor and the spool.

9 Claims, 10 Drawing Sheets

SEAT BELT RETRACTOR

BACKGROUND OF INVENTION

The present invention relates to a method of controlling a seat belt retractor having a function of winding up a seat belt under the power of a motor.

Vehicles are equipped with seat belt retractors in order to ensure the safety of a vehicle occupant upon an accident, such as vehicle collision, and various types of seat belt retractors have been developed. An example of one of the simplest structure among them is shown in FIG. 10.

FIG. 10 discloses a spring cover 41, as a supporting member at one side of the seat belt retractor, is provided with a bearing 41a arranged therein, into which a shaft 42a of a spool 42 is fitted so as to rotate while a biasing force of a spring is applied to the shaft 42a in the winding direction. Around the spool 42, a seat belt is wound.

Inside the spool 42, a concave fitted portion is formed, into which one end of a torsion bar 43 is fitted. The other end of the torsion bar 43 is fitted into a concave fitted portion formed In a locking base 44. A shaft 44a of the locking base 44 penetrates a hole 45a of a lock gear 45 so as to fit into a bearing of a retainer 46, as another supporting member at the other side of the seat belt retractor.

According to the aforementioned mechanism, as a result, the spool 42 is supported at its rotating axis by the spring cover 41 and the retainer 46 and is rotated to wind up the seat belt by means of the biasing force of the spring. The spring cover 41 and the retainer 46 are fixed at both sides of a base frame 48, so that the spool 42 is accommodated within the base frame 48.

Among these components, the locking base 44 and the lock gear 45 are relatively rotatable by a predetermined angle. The lock gear 45 is biased by a spring 49 relative to the locking base 44 in the seat belt withdrawing direction to the limit of the relative rotation.

When the seat belt is withdrawn in a normal state, since there is no resistance against the rotation of the lock gear 45, the lock gear 45 can not overcome the biasing force of the spring 49 to thereby rotate together with the locking base 44.

Even when the spool 42 is rotated by the spring force so as to rotate the locking base 44 in the winding direction, the lock gear 45 rotates together with the locking base 44 because the lock gear 45 is originally biased to the limit of the rotation relative to the locking base 44 in this direction as mentioned above.

When the seat belt is rapidly withdrawn due to a collision or the like, a flywheel 50 accommodated within the lock gear 45 is displaced by overcoming the biasing force of a spring 51, thereby preventing the relative rotation of the lock gear 45 relative to the retainer 46 and stopping the rotation of the lock gear 45.

Then, the locking base 44 rotates relative to the lock gear 45 against the biasing force of the spring 49. A mechanism is constructed such that a pawl 52 accommodated in the locking base 44 protrudes outside by this relative rotation, and a gear of the externally protruded pawl 52 engages a toothed portion 48a formed in the base frame 48, thereby stopping the rotation of the locking base 44 too. This mechanism is called "locking mechanism".

Accordingly, the rotation of the torsion bar 43 is also stopped and the spool 42 is allowed to rotate only by an angle corresponding to a twist of the torsion bar 43.

Therefore, the seat belt is thereafter withdrawn under a tension generated by the twist of the torsion bar. This mechanism is called "force limiter".

The above is a general description of the seat belt retractor. The seat belt retractor includes complex mechanisms for use as a mechanism for stopping rotation of the lock gear 45 by the movement of the flywheel 50 and a mechanism for protruding the pawl 52 outside. However, the seat belt retractor is well known in the art and is used in common, so that more detailed description may be omitted.

The, the seat belt retractor shown in FIG. 10 is also provided with a seat belt winding-up mechanism called as a pyrotechnic pretensioner. This is for rapidly and strongly winding up the seat belt when a vehicle collision actually takes place, thereby restraining the occupant to the vehicle seat. Hereinafter, the structure of the pyrotechnic pretensioner will be explained.

The pretensioner comprises a pretensioner cover 61, a pretensioner plate 62, and a pipe 63 between the pretensioner cover 61 and the pretensioner plate 62. Disposed at one end of the pipe 63 is a gas generator 64. Inside the pipe 63, a stopper spring 65, a piston 66, and a plurality of balls 67 are arranged. The pipe 63 has a cut-out portion formed in a portion near the other end thereof and a guide block 68 inserted in the other end.

The pretensioner cover 61 is provided with two pins 69. A ring gear 70 is received and supported by the pins 69. The front most ball 67 is sandwiched and fixed between external teeth of the ring gear 70 and an inwardly facing wall of the pipe 63 where no cut-out exists.

On the other hand, the pinion 72 is fitted around the gear 71 of the spool 42. In the normal state, the ring gear 70 and the pinion 72 are out of mesh. When gas is generated from the gas generator 64, the balls 67 are pressed via the piston 66 by the pressure of generated gas so as to break the pins 69, whereby the ring gear 70 becomes free and meshes the pinion 72. In this state, the external teeth 71a of the ring gear 70 are pressed by the balls 67 to rotate the ring gear 70. Accordingly, the ring gear 70 rotates the spool 42 via the pinion 72. In this manner, the seat belt is pretensioned. The mechanism as described above is also well known in the art so that the more detailed description will be omitted.

SUMMARY OF INVENTION

A first embodiment of the present invention is a seat belt retractor having a mechanism of winding up a seat belt by a motor, comprising: the motor; a spool onto which a seat belt is wound; a power transmission switching mechanism which, in the connected state, allows the spool to rotate only in the seat belt winding direction and which, in the disconnected state, allows the spool to rotate in both directions; a force limiter mechanism which allows the spool, onto which the seat belt is wound, to rotate in the seat belt withdrawing direction against twisting force generated by a torsion bar when force rapidly withdrawing the seat belt is applied; and a pyrotechnic pretensioner which forces to wind up the seat belt at the time of detection of a collision, wherein the power transmission switching mechanism is set into the disconnected state by the movement of a mechanical portion of the pyrotechnic pretensioner which moves when the pyrotechnic pretensioner is activated, thereby disconnecting the mechanical connection of the motor and the spool.

According to this embodiment of the present invention, the power transmission switching mechanism is set into the disconnected state by the movement of a mechanical portion of the pyrotechnic pretensioner which moves when the pyrotechnic pretensioner is activated, thereby disconnecting the mechanical connection of the motor and the spool (in this specification, the disconnected state of the power transmission switching mechanism means that the mechanical power transmission between the motor and the spool is set not to act, while the connected state of the power transmission switching mechanism means that the mechanical power transmission between the motor and the spool is set to act). Therefore, the mechanical connection between the motor and the spool can be shut off by mechanical means only when the pyrotechnic pretensioner is activated, thereby preventing the motor from loading when the "force limiter mechanism" is thereafter operated.

A second embodiment of the present invention calls for the power transmission switching mechanism to include a ratchet wheel, the connected state and the disconnected state are switched depending on the presence or absence of engagement between a stopping member, which is driven by the rotational force of the motor into the seat belt winding direction, and the ratchet wheel, and the stopping member is released from the engagement with the ratchet wheel by the movement of the mechanical portion of the pyrotechnic pretensioner which moves when the pyrotechnic pretensioner is activated.

According to the second embodiment of the present invention, the connected state and the disconnected state of the power transmission switching mechanism are switched depending on the engagement between a stopping member, which is driven by the rotational force of the motor, and the ratchet wheel, and the stopping member is released from the engagement with the ratchet wheel by the movement of the mechanical portion of the pyrotechnic pretensioner which moves when the pyrotechnic pretensioner is activated, thereby simplifying the structure.

According to another embodiment of the present invention, the retractor may include a control lever which is rotatable under the rotational torque of the motor, wherein the control lever drives the stopping member to control the engagement between the stopping member and the ratchet wheel.

According to this embodiment, as the motor rotates in the winding direction, the control lever is rotated under the torque of the motor so as to engage the stopping member with the ratchet wheel, thereby enabling the power transmission between the motor and the spool. When the motor does not rotate, the control lever is in the initial position where the stopping member and the ratchet wheel are not engaged with each other, thereby disconnecting the power transmission between the motor and the spool and thus allowing the spool to freely rotate. Therefore, the power transmission between the motor and the spool can be switched by simple structure.

According to another embodiment of the present invention, the retractor may comprise a reduction mechanism which reduces the speed of rotation of the motor and transmits the rotation of the motor to the spool, wherein the reduction mechanism comprises a sun gear to which the rotation of the motor is transmitted, a ring-shaped internal gear which is rotatably disposed and has ratchet teeth on the external periphery thereof and inner teeth on the internal periphery thereof, a planetary gear(s) which Is meshed with both the sun gear and the internal gear, and a carrier which supports the planetary gear such that the planetary gear can rotate on the own axis and transmits the revolution of the planetary gear to the spool, and the power transmission switching mechanism further comprises a stopping lever which is capable of pivoting between the disengaging position where the stopping lever is not engaged with the ratchet teeth and the engaging position where the stopping lever can be engaged with the ratchet teeth, wherein when the control lever does not rotate, i.e. in the normal state, the stopping lever is set in the disengaging position to allow the internal gear to freely rotate, and when the control lever rotates, the stopping lever is set in the engaging position so as to engage the stopping lever with the ratchet teeth, thereby preventing the rotation of the internal gear, and wherein when the rotation of the internal gear is prevented, the power transmission switching mechanism is set in the connected state and when the rotation of the internal gear is free, the power transmission switching mechanism is set in the disconnected state.

According to this means, the internal gear is rotatable with little load when the stopping lever is not engaged with the ratchet teeth. As the motor rotates from this state, the sun gear is rotated. Since the internal gear Is rotatable with little load while the planetary gear(s) is subjected to the load of the spool, each of the planetary gear rotates on its axis without revolution so as to rotate the internal gear. The power of the motor is not transmitted to the spool.

As the spool is rotated from this state, the planetary gear revolves to rotate the internal gear but not rotate the sun gear because the sun gear is subjected to the load of the motor while the internal gear is subjected to no load. Since the power transmission between the spool and the motor is shut off, the seat belt can be freely wound up or withdrawn without effect of load of the motor.

As the stopping lever is engaged with the ratchet teeth, the rotation of the internal gear is prevented. As the motor rotates from this state, the reduction gear and the sun gear are thereby rotated. Since the internal gear is prevented from rotating, the planetary gear is rotated on its axis by the sun gear and is subjected to the revolution force from the internal gear so as to revolve. Therefore, the spool connected to the planetary gear is subjected to the driving force and is thus rotated. When the spool is rotated in this case, the planetary gear revolves so that the sun gear is subjected to the rotational force and the motor is thus subjected to the rotational force. This means that the power transmission between the motor and the spool is established.

According to another embodiment of the present invention, the retractor may comprise a reduction mechanism which reduces the speed of rotation of the motor and transmits the rotation of the motor to the spool, wherein the reduction mechanism comprises a sun gear for transmitting the rotation of the motor to the spool, a ring-shaped internal gear which is rotatably disposed and has ratchet teeth on the external periphery thereof and inner teeth on the internal periphery thereof, a planetary gear(s) which is meshed with both the sun gear and the internal gear, and a carrier which supports said planetary gear such that the planetary gear can rotate on the own axis and also revolves the planetary gear by the rotation of the motor, and the power transmission switching mechanism further comprises a stopping lever which is capable of pivoting between the disengaging position where the stopping lever is disengaged from the ratchet teeth and the engaging position where the stopping lever can be engaged with the ratchet teeth, wherein when the control lever does not rotate, i.e. in the normal state, the stopping lever is set in the disengaging position to allow the internal gear to freely rotate, and when the control lever rotates, the stopping lever is set in the engaging position so as to engage the stopping lever with the ratchet teeth, thereby preventing the rotation of the internal gear, and wherein when the rotation of the internal gear is free, the power transmission switching mechanism is set in the disconnected state and when the rotation of the internal gear is prevented, the power transmission switching mechanism is set in the connected state.

This embodiment of the invention differs from previous embodiments only in that the sun gear is connected to the spool and the planetary gear is connected to the motor and is identical in operation to the forth means so as to exhibit the same works and effects as the fourth means.

According to another embodiment of the present invention, the engagement of the stopping member relative to the ratchet wheel is cancelled by directly or indirectly utilizing the movement of a rotational body, which is directly or indirectly subjected to the pyrotechnic power generated at the time of the operation of the pyrotechnic pretensioner and is thus rotated, and which then transmits its rotation to said spool.

An ordinary pyrotechnic pretensioner has a rotational body which is directly or indirectly subjected to the pyrotechnic power generated at the time of the operation of the pyrotechnic pretensioner, is thus rotated, and transmits its rotational force to the spool. According to this embodiment, the engagement of the stopping member relative to the ratchet wheel is cancelled by directly or indirectly utilizing the movement of this rotational body so that the seat belt retractor is simple in structure.

According to yet another embodiment of the present invention, the pyrotechnic pretensioner has a pipe and balls arranged inside the pipe and transmits the pyrotechnic power to the balls, then transmits the force of the balls to external teeth of a wheel to rotate the wheel, and transmits the rotation of the wheel to the spool, the seat belt retractor comprising a first elastic member which takes a form defined by the external teeth of the wheel in the normal state and changes its form because of its spring force when the wheel is rotated, and a second elastic member which takes a form defined by the first elastic member in the normal state and changes its form because of its spring force when the first elastic member changes its form, wherein the engagement of the stopping member relative to the ratchet wheel is cancelled by the biasing force of the second elastic member when changing its form.

It is to be understood that both the foregoing general description and the following detailed description are exemplary and explanatory only, and are not restrictive of the invention as claimed.

BRIEF DESCRIPTION OF DRAWINGS

These and other features, aspects and advantages of the present invention will become apparent from the following description, appended claims, and the accompanying exemplary embodiments shown in the drawings, which are briefly described below and which constitute part of this specification.

DETAILED DESCRIPTION

Hereinafter, an embodiment of the present invention will be described with reference to the attached drawings.

The inventors have improved such conventional seat belt retractor to invent a seat belt retractor having a function of winding up a seat belt under the power of a motor to remove slack of the seat belt and also restraining the occupant with somewhat force at the time of prediction of a collision not after the occurrence of a collision. The invention was disclosed in Japanese Patent Application No. 2001-12886 (incorporated by references herein).

The seat belt retractor has a mechanism for winding up a seat belt by a motor and comprises a spool around which the seat belt is wound and a power transmission switching mechanism (ratchet mechanism) which allows the spool to rotate only in the seat belt-retraction direction when connected and allows the spool to rotate in both directions when not connected.

Figure 4:
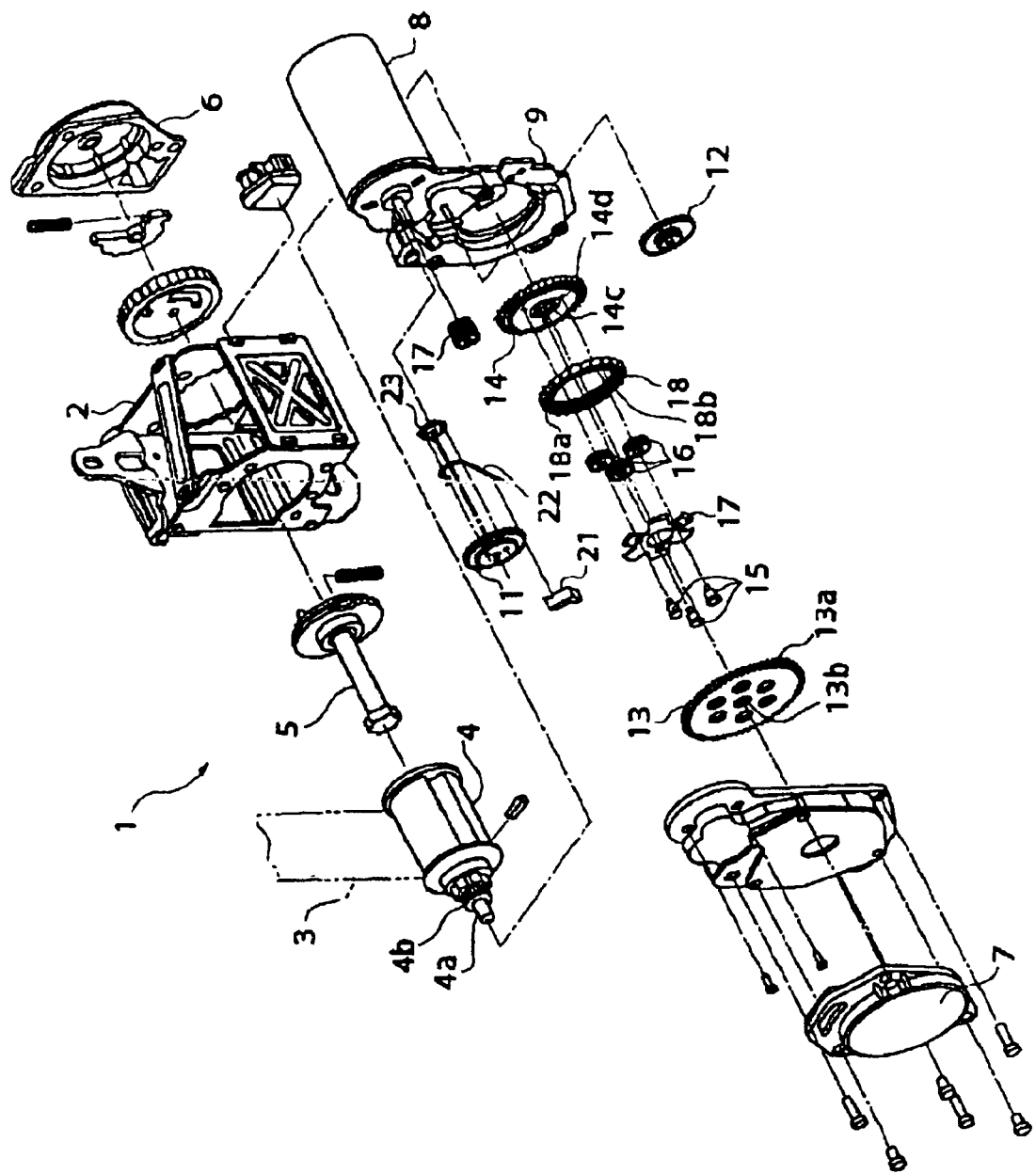
FIG. 4 is an exploded perspective view showing the outline of a seat belt retractor according to an embodiment of the present invention.

FIG. 4 is an exploded perspective view showing the outline of a seat belt retractor according to an embodiment of the invention. It should be noted that though the embodiment shown in FIG. 4 is provided with a locking mechanism, a force limiter mechanism, a spring (not shown) for rotating the spool, and the like which are similar to those shown in FIG. 10, the description about the components will be omitted because these are not necessary for an understanding of the present invention.

As shown in FIG. 4, in a seat belt retractor 1, a spool 4 for winding up a seat belt 3 is accommodated within a frame 2, one end of a torsion bar 5 for supporting the spool 4 is fitted into a retainer 6 and the other end thereof is fitted inside the spool 4.

A spool shaft 4a is fitted into a bearing of a spiral spring unit 7 in which a spring (not shown) for winding up a seat belt is accommodated. The retainer 6 and the spiral spring unit 7 are held by the frame 2. Accordingly, the spool 4 is accommodated within the frame 2 in the form of being held by the retainer 6 and the spiral spring unit 7.

A motor 8 is fixed to a second retainer 9 and a motor gear 10 connected to a shaft of the motor 8 is meshed with a connecting gear 11 of which rotation is transmitted to a reduction gear 13 via an intermediate reduction gear 12. The reduction gear 13 has large-diameter toothed portion 13a to be meshed with the intermediate reduction gear 12 at the external periphery and a sun gear 13b at the center thereof.

A carrier gear 14 with a central hole (spline hole) 14c fitted with a spline shaft 4b of the spool 4 rotates together with the spool 4. The carrier gear 14 is provided with three threaded holes 14d into which threaded ends of reduction pins 15 are screwed. Each one of planetary gears 16 is rotatably supported by the respective reduction pins 15 and held by a reduction plate 17.

Figure 5:
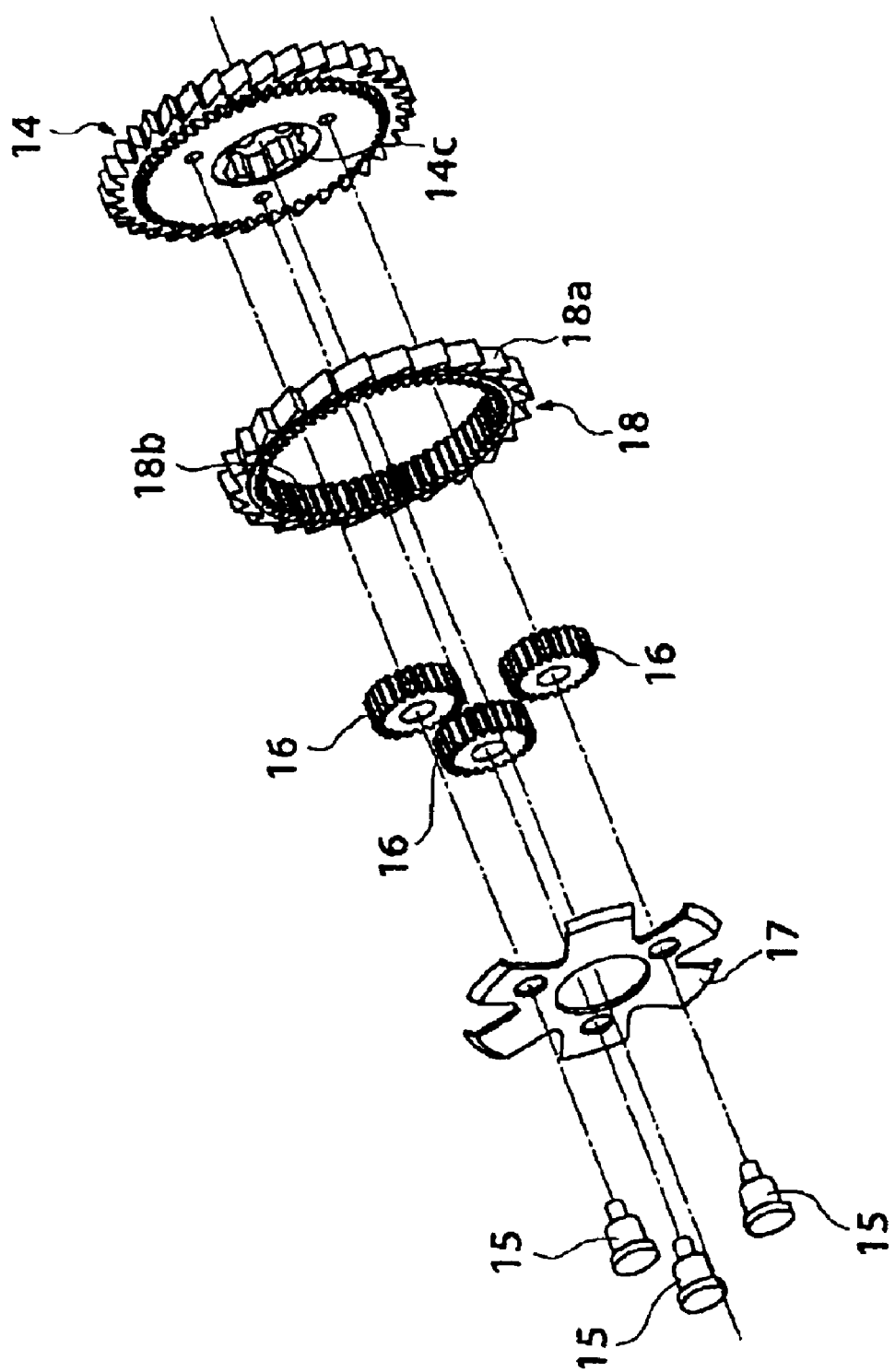
FIG. 5 is a schematic illustration showing main parts of a power transmission route mechanism in the embodiment shown in FIG. 4.

An internal gear 18 has a ring-like configuration as shown in FIG. 5 and has ratchet teeth 18a on the external periphery and internal teeth 18b on the internal periphery, which mesh the planetary gears 16. That is, the planetary gears 16 are disposed between the sun gear 13b and the internal teeth 18b of the internal gear 18, and the planetary gears 16 can rotate on their own axes about the reduction pins 15 while being capable of revolving around the center of the carrier gear 14 (the shaft center of the spool 4).

In the seat belt retractor having the aforementioned structure, a stopping lever 21, a lever spring 22 for holding the stopping lever 21 and being rotatable together with a connecting gear 11, and a spring-holding member 23 are provided for composing a power transmission route switching mechanism between the spool 4 and the motor 8.

Figure 6:
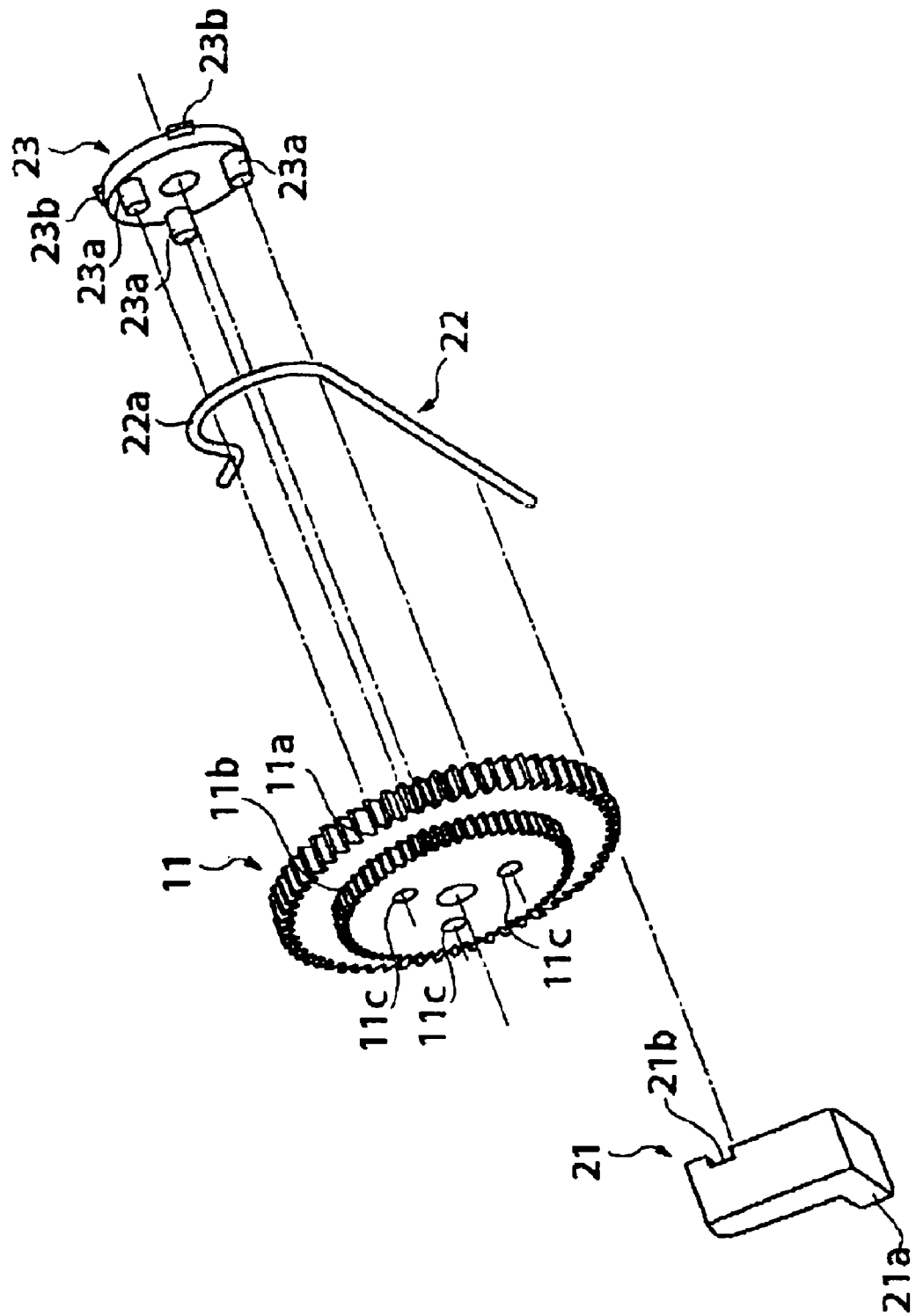
FIG. 6 is a schematic illustration showing main parts of the power transmission route mechanism in the embodiment shown in FIG. 4.

This mechanism is illustrated in FIG. 6 in detail. A side face in the axial direction of the spring-holding member 23 is provided with three protruding pins 23a extending in the axial direction. The spring-holding member 23 is assembled to the connecting gear 11 by inserting the protruding pins 23a into three axial holes 11c of the connecting gear 11, respectively. On the external peripheral face of the spring-holding member 23, three projections 23b extending in the radial direction are arranged at equal intervals in the circumferential direction. While the lever spring 22 is arranged so as to locate a curved portion 22a thereof on the external periphery of the spring-holding member 23, the curved portion 22a is sandwiched between two projections 23b of the spring-holding member 23 and the connecting gear 11 with a predetermined friction in the rotational direction. In this manner, the lever spring 22 is assembled to the spring-holding member 23.

The stopping lever 21 moves along a groove formed in the second retainer 9.

According to the movement, the stopping lever 21 can come into and out of contact with the ratchet teeth 18a of the internal gear 18. The stopping lever 21 is driven by the lever spring 22 fitted into a recess 21b thereof so as to move as mentioned above.

Figure 7:
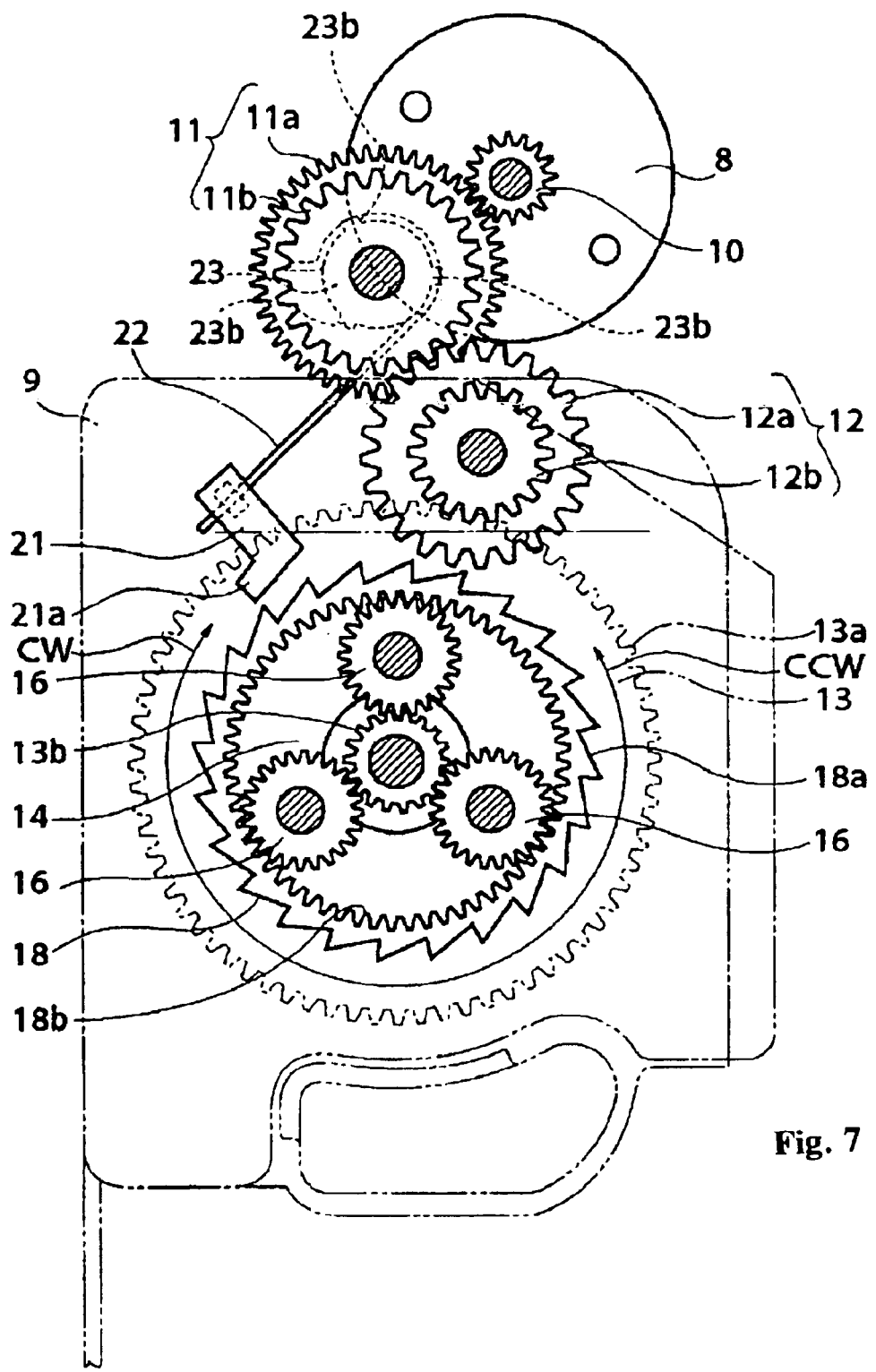
FIG. 7 is an illustration for explaining the operation of the power transmission route switching mechanism in the embodiment shown in FIG. 4.

The mechanism for the power transmission between the motor 8 and the spool 4 and the power transmission switching mechanism will be described below with reference to FIGS. 7 through 9.

As shown in these drawings, the rotation of the motor 8 is transmitted from the motor gear 10 to the connecting gear 11 via teeth 11a of the connecting gear 11, and is further transmitted to the intermediate reduction gear 12 via teeth 11b of the connecting gear 11 and the teeth 12a of the intermediate reduction gear 12. Then, the rotation of the motor 8 is furthermore transmitted to the reduction gear 13 via the teeth 12b of the intermediate reduction gear 12 and the large-diameter teethed portion 13a of the reduction gear 13. The reduction gear 13 is provided with the sun gear 13b integrally attached thereto coaxially. Therefore, when the motor 8 rotates, the gear train is rotated together.

On the other hand, the spline shaft 4b of the spool 4 shown in FIG. 4 is fitted with the central hole (spline hole) 14c of the carrier gear 14. Therefore, when the spool 4 rotates, the carrier gear 14 is rotated together, and three planetary gears 16 are thus revolved around the spool shaft.

The element of switching on and off the connection between the power transmission system connected to the motor 8 and the power transmission system connected to the spool 4 is the internal gear 18. FIG. 7 shows a state that the motor 8 is not rotated. At this time, the stopping lever 21 is located in such a position not to engage the ratchet gear 18a of the internal gear 18 by means of the biasing force of the lever spring 22. Therefore, the internal gear 18 is in a completely free state and can rotate without any resistance. In contrast, the sun gear 13b and the reduction gear 13 cannot rotate unless their forces overcome the rotational resistance of the motor 8.

In this state, when the spool 4 rotates in either direction, the planetary gears 16 revolve. Because the internal gear 18 has no resistance at this time, the planetary gears 16 revolve around the sun gear 13a while rotating on its own shaft so as to rotate the internal gear 18. That is, the sun gear 13a does not rotate. Therefore, the spool 4 can rotate without the rotational resistance of the motor 8. Accordingly, when an occupant pulls out the seat belt, the seat belt can be withdrawn without a large resistance (only against the force of the spiral spring for winding).

Figure 8:
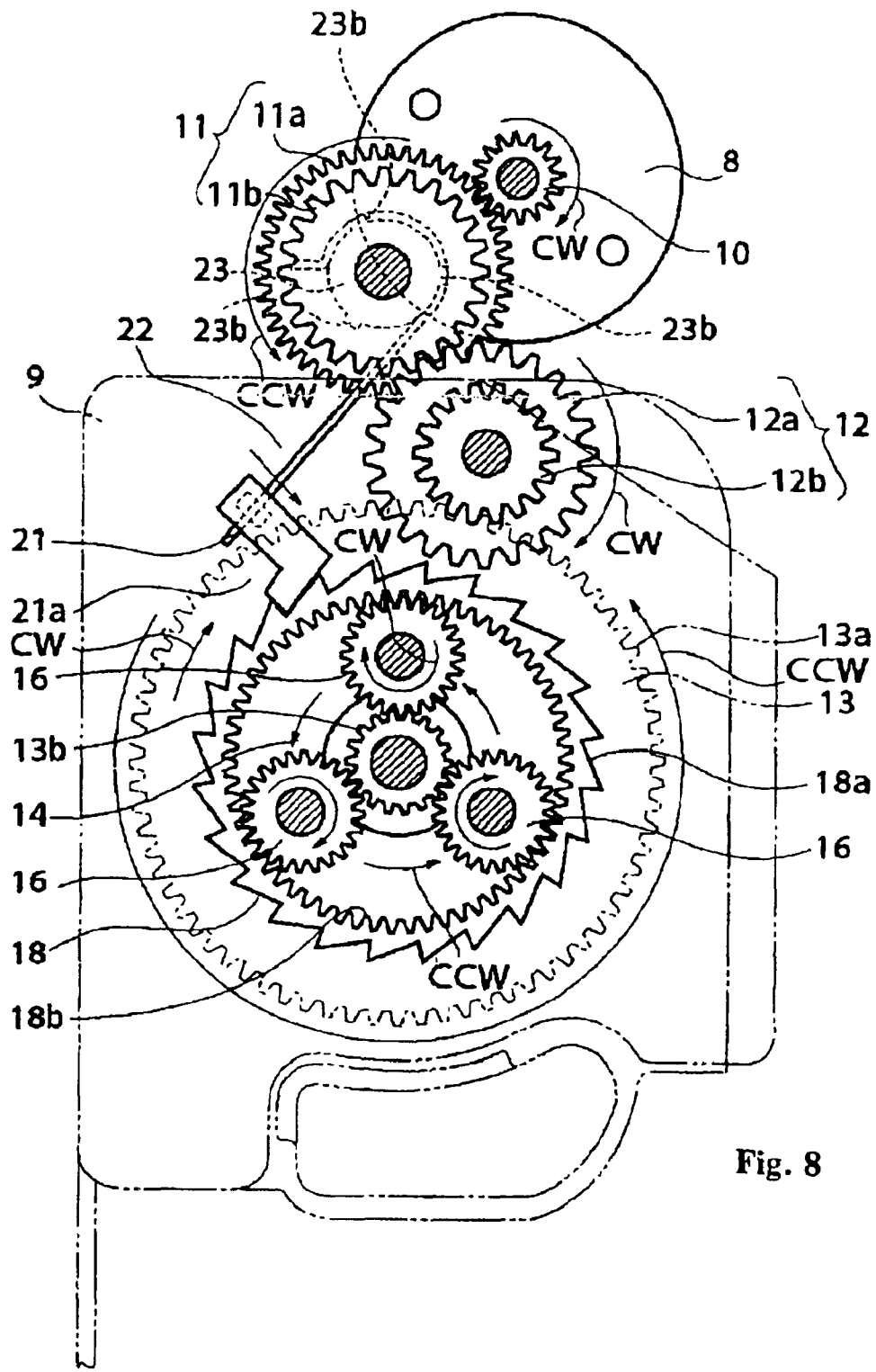
FIG. 8 is an illustration for explaining the operation of the power transmission route switching mechanism in the embodiment shown in FIG. 4.

FIG. 8 is an illustration showing a state that the motor 8 is driven in the seat belt winding direction. That is, when the motor 8 rotates in the CW direction in FIG. 8, the connecting gear 11 is reduced in the speed and rotated in the CCW direction. Then, since the curved portion 22a of the lever spring 22 is held between the projections 23b of the spring-holding member 23 and the connecting gear 11 with a predetermined friction in the rotational direction as described above, the lever spring 22 rotates In the same direction according to the rotation of the connecting gear 11 in the CCW direction.

Therefore, the stopping lever 21 moves toward the internal gear 18 to reach an engaging position where a stopping claw 21a abuts the external periphery of a ratchet tooth 18a of the internal gear 18 and thus engages the ratchet tooth 18a. After the stopping claw 21a abuts the external periphery of the ratchet tooth 18a, the lever spring 22 is prevented from rotating in the CCW direction. However, the connecting gear 11 and the lever spring 22 slip relative to each other so that the connecting gear 11 rotates relative to the lever spring 22, allowing the motor 8 to continue to rotate.

Simultaneously, the rotation of the connecting gear 11 is reduced in speed via the intermediate reduction gear 12 and is transmitted to the reduction gear 13 which in turn rotates in the CCW direction, so that the sun gear 13b rotates at the same speed and in the same direction as those of the reduction gear 13. The rotation of the sun gear 13b causes each planetary gear 16 to rotate on its axis in the CW direction and the internal gear 18 to rotate in the CW direction. At this time, each planetary gear 16 does not revolve because the internal gear 18 rotates.

When the internal gear 18 rotates in the CW direction, one of the ratchet teeth 18a and the stopping claw 21a are engaged with each other so as to stop the rotation of the internal gear 18.

When the internal gear 18 stops to rotate, because each planetary gear 16 rotates on its axis due to the driving torque of the motor 8 as mentioned above, each planetary gear 16 is reduced in speed and revolved around the sun gear 13b in the CCW direction along the internal teeth 18b of the internal gear 18.

Accordingly, the carrier gear 14 holding the planetary gears 16 rotates at the same speed as the revolving speed of each planetary gear 16 in the CCW direction so that the spool 4 rotates in the seat belt winding direction.

Figure 9:
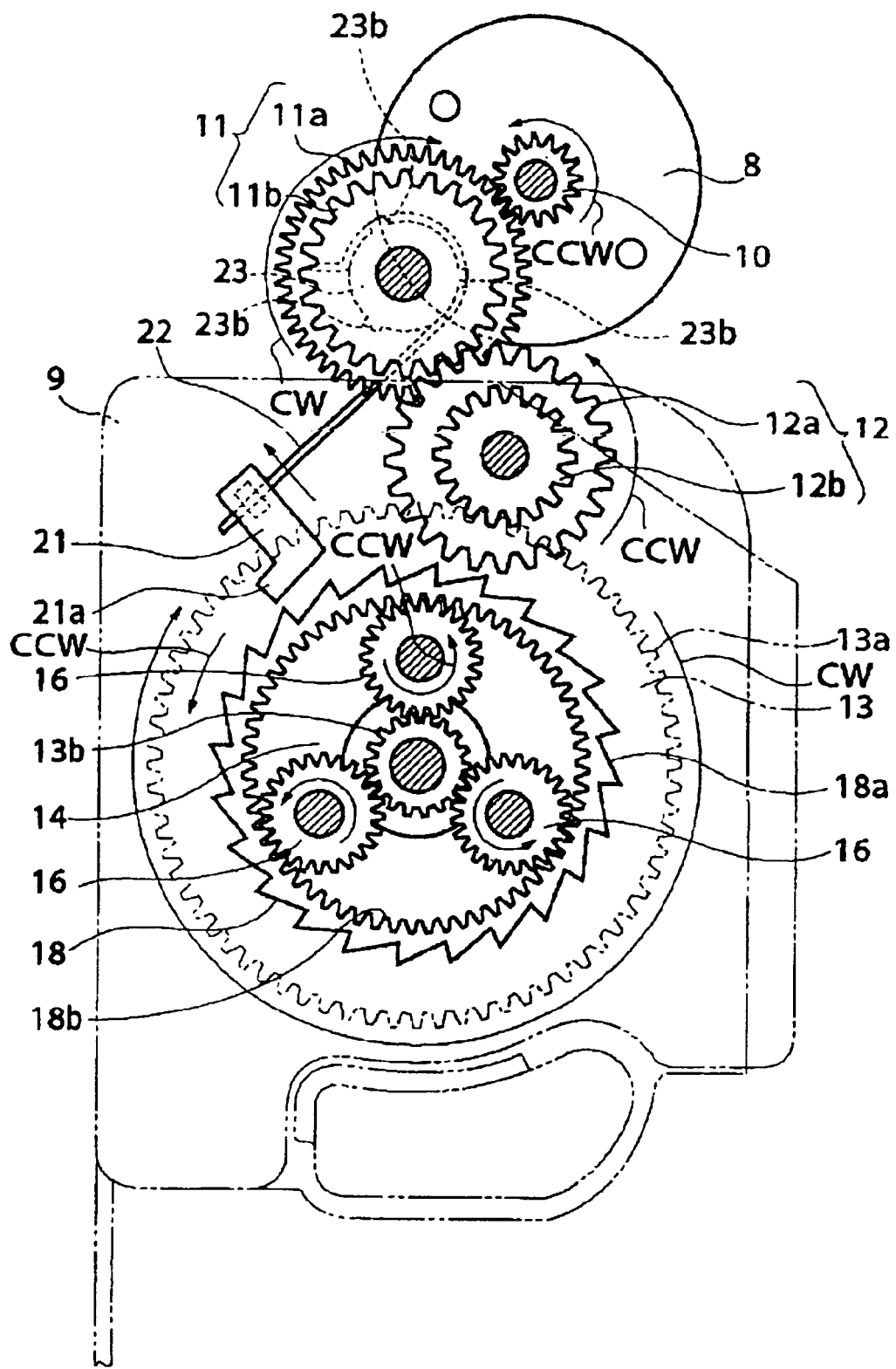
FIG. 9 is an illustration for explaining the operation of the power transmission route switching mechanism in the embodiment shown in FIG. 4.

FIG. 9 is an illustration showing a state that the motor 8 rotates in the seat belt withdrawing direction. When the motor 8 rotates in the CCW direction In FIG. 9, the connecting gear 11 is reduced in speed and rotated in the CW direction. Then, because the curved portion 22a of the lever spring 22 is held between the projections 23b of the spring-holding member 23 and the connecting gear 11 with the predetermined friction in the rotational direction as described above, the lever spring 22 also rotates together in the same direction according to the rotation of the connecting gear 11 in the CW direction. Therefore, the stopping lever 21 moves in the direction apart from the internal gear 18 so that the stopping claw 21a and the ratchet teeth 18a of the internal gear 18 are disengaged from each other. Then, the internal gear 18 can rotate freely.

In the same manner as that shown in FIG. 8, the reduction gear 13 and the sun gear 13a are driven by rotation of the motor 8 so that the rotation of the sun gear 13a is transmitted to the planetary gears 16 so as to rotate the planetary gears 16 on their axes. However, because the internal gear 18 rotates without any rotational resistance, the planetary gears 16 do not revolve so that the rotation of the motor 8 is not transmitted to the spool 4.

As the description above is summarized, when the motor rotates in the winding direction, the rotation of the internal gear is stopped by the stopping lever driven by the rotational force of the motor so that a power transmission route between the motor and the spool is connected. In other cases, the stopping lever is not engaged with the internal gear so that the internal gear can rotate freely and the power transmission route between the motor and the spool is thereby disconnected.

Though the stopping lever is driven by using the power of the motor in the embodiment described above, for example, the stopping lever may be electrically driven by a solenoid to engage and disengage with the internal gear.

According to an embodiment of the present invention, in a normal condition, the power transmission route between the motor and the spool is disconnected by the power transmission route switching mechanism. The seat belt is wound up by the spiral spring. Therefore, an occupant can pull out the seat belt with a force only against the force of the spiral spring for winding.

When a signal indicating the prediction of possibility of an accident such as a collision is sent from a collision predicting device, a controller for a seat belt retractor drives the motor in the seat belt winding direction and simultaneously connects the power transmission route between the motor and the spool by means of the power transmission route switching mechanism. This may be automatically performed by driving the motor in the seat belt winding direction, as described in the embodiment above. Accordingly, the rotating force of the motor is transmitted to the spool so that the seat belt is wound up by the rotation of the spool. The winding-up the seat belt is started at the time of prediction of a collision and not after the occurrence of an actual collision as conventionally performed so that an occupant can be securely restrained in a seat.

When an accident such as a collision does not actually occur, the drive of the motor is stopped and the operation of the power transmission switching mechanism (the ratchet mechanism) is cancelled simultaneously, whereby the spool can be freely rotated, enabling an occupant to readily withdraw the seat belt.

It should be noted that the illustration of a pyrotechnic pretensioner is omitted for avoiding the illustration from being complex and the description of the same is also omitted in the description of the first prior invention. However, the pyrotechnic pretensioner is arranged on the right-hand side of the second retainer 9 in FIG. 4. The pyrotechnic pretensioner in this case may be identical in action and function to the illustrated conventional example.

The present invention may be also provided with a mechanism for allowing the spool to rotate in the seat belt winding direction and preventing the spool from rotating in the withdrawing direction when the seat belt is wound up by the rotation of the motor.

However, there is a possibility of occurrence of the following phenomenon in an apparatus having such a pyrotechnic pretensioner That is, in the conventional art, after the pyrotechnic pretensioner is activated because of actual collision so as to restrain an occupant to a seat strongly, the pyrotechnic power is cancelled, thus allowing the seat belt to be withdrawn. For this, the aforementioned "force limiter mechanism" is operated, whereby the seat belt is withdrawn under a tension generated by the twist of the torsion bar.

However, as described above, there is a possibility that the rotation of the internal gear 18 is held to be stopped even when the pyrotechnic pretensioner is actuated. This is because the ratchet tooth 18a and the stopping pawl 21a may be held in the engaged state. In this case, after the pyrotechnic pretensioner is activated because of actual collision so as to restrain strongly an occupant to a seat, the pyrotechnic power is cancelled. When the seat belt is thereby allowed to be withdrawn, the motor may give load against the force of withdrawing the seat belt because the motor is still mechanically connected to the spool.

Japanese Patent Application No. 2001-133967 (incorporated by reference herein) discloses an apparatus wherein the engagement between the ratchet tooth 18a and the stopping claw 21a is cancelled so as to release the mechanical connection (clutch mechanism) between the motor and the spool by driving the motor in reverse at substantially the same time as the actuation of the pyrotechnic pretensioner, thereby preventing the motor from loading against the withdrawing force during the operation of the "force limiter mechanism". This method is electrically releasing the mechanical connection between the motor and the spool.

One object of the present invention is to provide a seat belt retractor which can secure the operation of the "force limiter mechanism" by releasing the mechanical connection (clutch mechanism) between the motor and the spool by mechanical mechanism.

Figure 1:
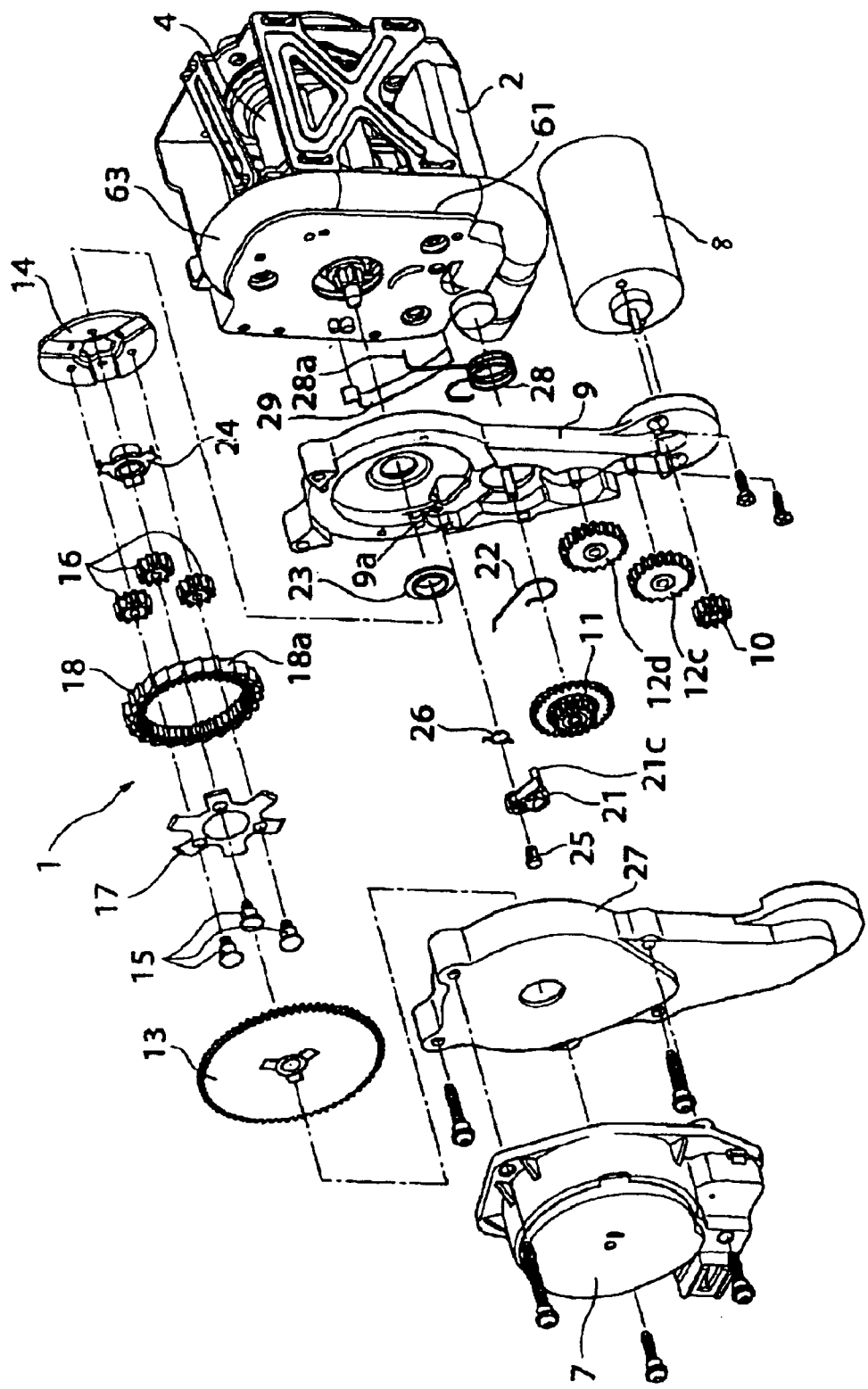
FIG. 1 is an exploded perspective view of a seat belt retractor showing an embodiment according to the present invention and showing main components related to the present invention.

FIG. 1 is an exploded perspective view of a seat belt retractor according to an embodiment of the present invention. In the following drawings, the same components as those shown in the prior drawings are marked with the same numerals in principle. However, the arrangement and structure of the components are changed a little from those shown in FIG. 4. Similarly to the example shown in FIG. 10, a pyrotechnic pretensioner is provided, but only a pretensioner cover 61 and a pipe 63 are illustrated. According to the present invention, the pyrotechnic pretensioner may be identical to that described with reference to FIG. 10.

Hereinafter, description will center on the different points of the embodiment shown in FIG. 1 from the example shown in FIG. 4. The output of a motor 5 is transmitted to a connecting gear 11 via two intermediate reduction gears 12c, 12d. On the side of the connecting gear 11 that is hidden and not seen in FIG. 1, a lever spring 22 is wound around a shaft of the connecting gear 11 so that the lever spring 22 can rotate together with the connecting gear 11. However, as force exceeding a predetermined value preventing the rotation of the lever spring 22 is exerted to the lever spring 22, the force overcomes the spring force of the lever spring 22 connecting itself to the connecting gear 11, whereby the lever spring 22 is stopped at the position so as to allow the relative rotation between the lever spring 22 and the connecting gear 11.

Hereinafter, description will center on the different points of the embodiment shown in FIG. 1 from the example shown in FIG. 4. The output of a motor 8 is transmitted to a connecting gear 11 via two intermediate reduction gears 12c, 12d. On the side of the connecting gear 11 that is hidden and not seen in FIG. 1, a lever spring 22 is wound around a shaft of the connecting gear 11 so that the lever spring 22 can rotate together with the connecting gear 11. However, as force exceeding a predetermined value preventing the rotation of the lever spring 22 is exerted to the lever spring 22, the force overcomes the spring force of the lever spring 22 connecting itself to the connecting gear 11, whereby the lever spring 22 is stopped at the position so as to allow the relative rotation between the lever spring 22 and the connecting gear 11.

When the motor rotates in the seat belt winding direction, the lever spring 22 rotates together with the connecting gear 11 in the counter-clockwise direction, thereby rotating the clutch pawl 21 in the clockwise direction in FIG. 1 as will be described later. Then, the clutch pawl 21 is engaged with one of the ratchet teeth 18a of the internal gear 18 so as to stop the rotation of the internal gear 18.

In this manner, the rotational force of the motor is transmitted to a spool 4 and this mechanism is the same as described with reference to FIG. 4 through FIG. 9. The retractor shown in FIG. 1 may be provided with a retainer bearing 23 and a carrier bearing 24. While the carrier gear 14 has ratchet teeth at the external periphery thereof in the example shown in FIG. 4 through FIG. 9, the carrier 14 may also be a simple carrier without such ratchet teeth as shown in FIG. 1.

Figure 2:
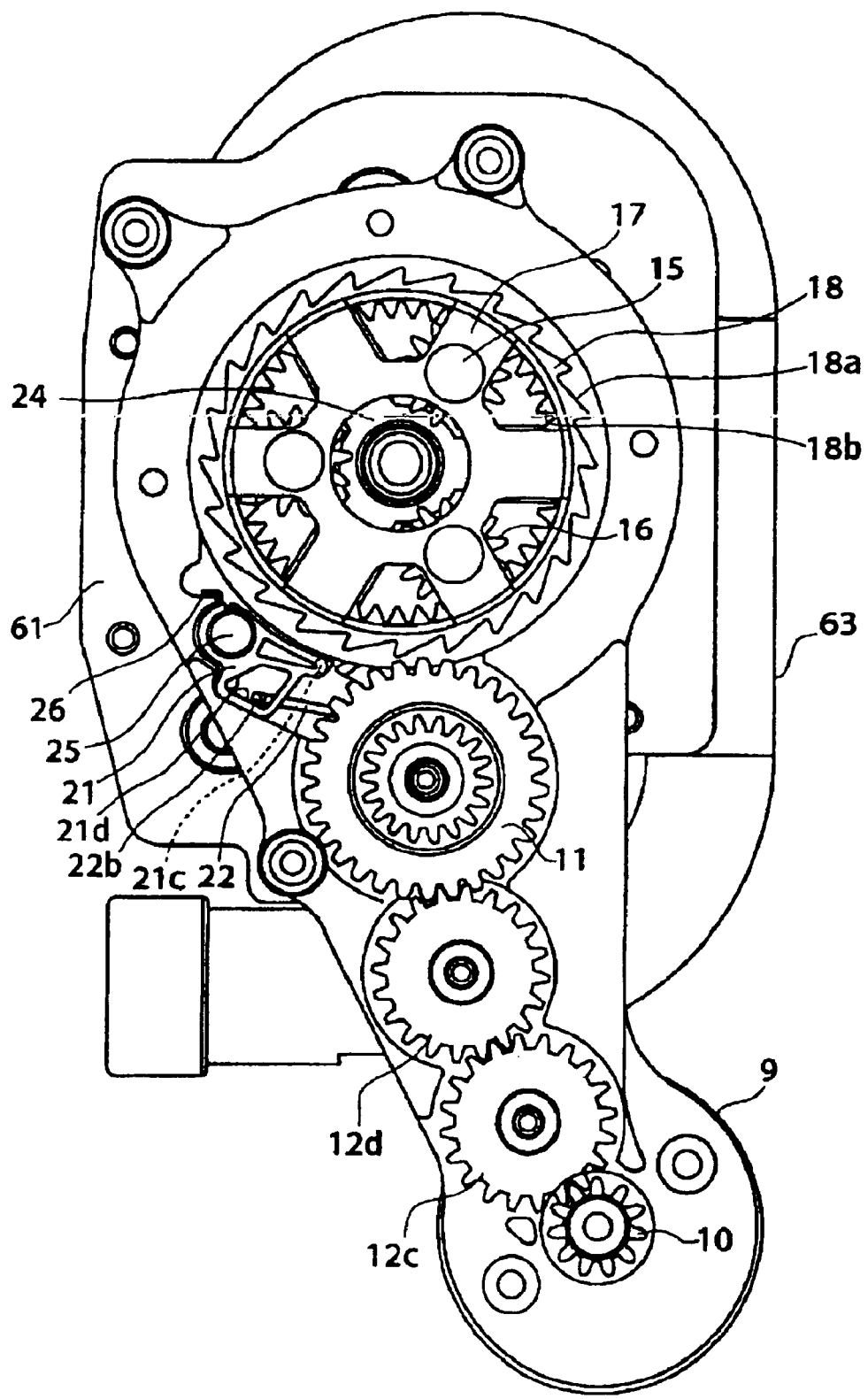
FIG. 2 is an illustration showing a mechanism for stopping an internal gear in FIG. 1 in detail.

In the embodiment shown in FIG. 1, as described above, the mechanism for stopping the internal gear 11 is different from the retractor shown in FIG. 4. This mechanism will be described with reference to FIG. 2 in detail. In FIG. 2, the clutch pawl 21 is mounted to the second retainer 9 by the clutch pawl pin 25 and is rotatable about the clutch pawl pin 25. The clutch pawl 21 has an opening 21d into which a tip end 22b of the lever spring 22 which is bent is inserted. The clutch pawl 21 is biased in the clockwise direction of FIG. 2 by a spring 26 which is partly seen, whereby the clutch pawl 21 is normally spaced apart from the ratchet teeth 18a of the internal gear 18.

As the motor 5 rotates in the seat belt winding direction, the internal gear 11 rotates in the clockwise direction and the lever spring 22 also rotates In the clockwise direction according to the rotation of the internal gear 11. Then, the tip end 22b of the lever spring 22 collides with the peripheral edge of the opening 21d and rotates the clutch pawl 21 in the counter-clockwise direction against the biasing force of the spring 26. Therefore, the end of the clutch pawl 21 is engaged with one of the ratchet teeth 18a of the internal gear 18, thereby stopping the rotation of the internal gear 18.

As the motor 8 rotates in the seat belt winding direction, the internal gear 11 rotates in the clockwise direction and the lever spring 22 also rotates in the clockwise direction according to the rotation of the internal gear 11. Then, the tip end 22b of the lever spring 22 collides with the peripheral edge of the opening 21d and rotates the clutch pawl 21 in the counter-clockwise direction against the biasing force of the spring 26. Therefore, the end of the clutch pawl 21 is engaged with one of the ratchet teeth 18a of the internal gear 18, thereby stopping the rotation of the internal gear 18.

As the motor 8 rotates in the seat belt withdrawing direction, the internal gear 11 rotates in the counter-clockwise direction and the lever spring 22 also rotates in the counter-clockwise direction according to the rotation of the internal gear 11. Then, the tip end 22b of the lever spring 22 collides with the peripheral edge of the opening 21d and cooperates with the biasing force of the spring 26 to rotate the clutch pawl 21 in the clockwise direction. Therefore, the end of the clutch pawl 21 is moved apart from the ratchet teeth 18a of the internal gear 18, whereby the internal gear 18 becomes free to rotate.

Figure 3:
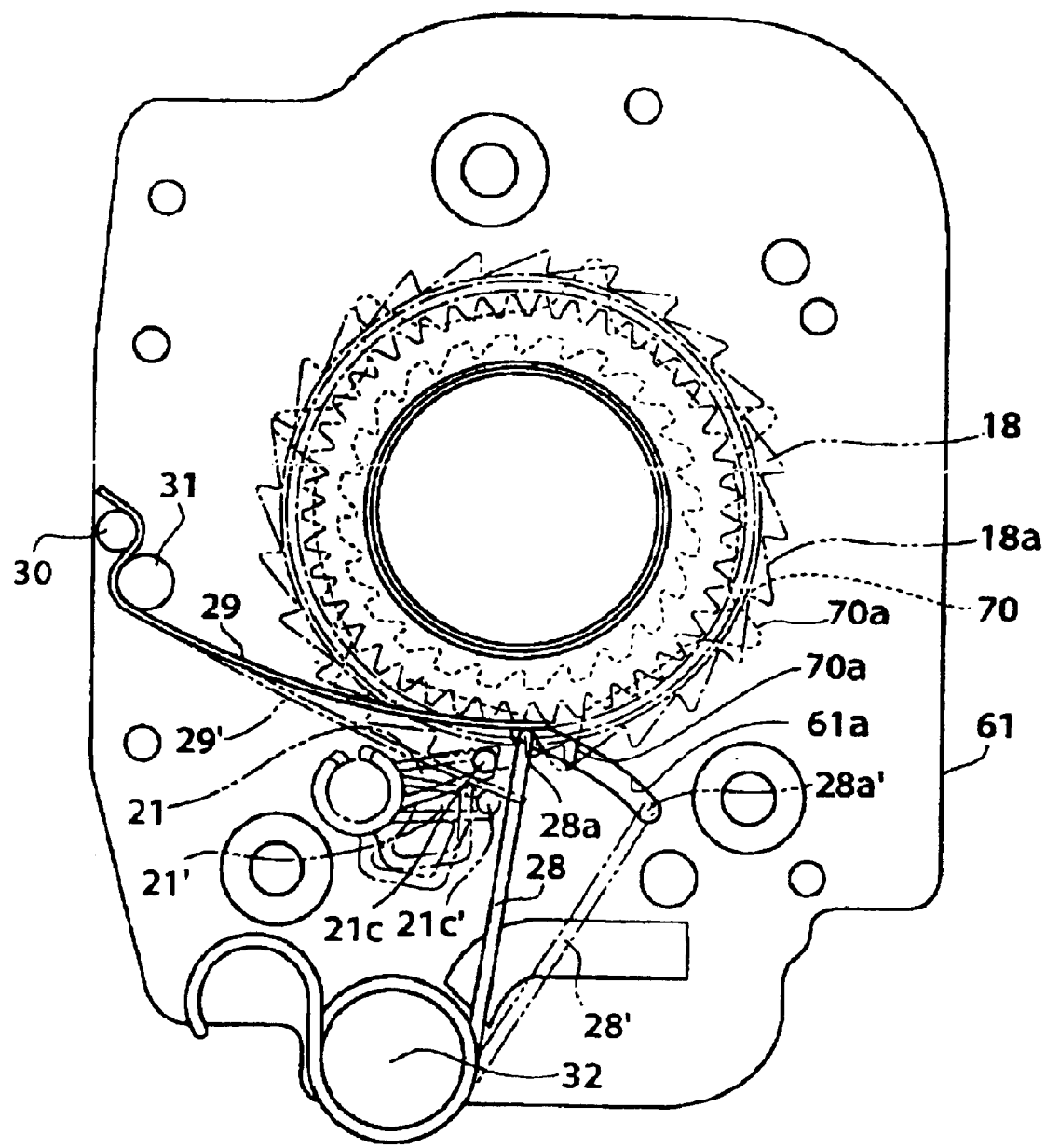
FIG. 3 is an illustration showing the structure of main components which act according to the activation of the pyrotechnic pretensioner.

Hereinafter, operation of the retractor when the pyrotechnic pretensioner is activated will be explained with reference to FIG. 1 through FIG. 3. FIG. 3 shows the structure of main components which act according to the activation of the pyrotechnic pretensioner. In addition, the illustration of FIG. 3 centers on the parts between the second retainer 9 and the pretensioner 61 shown in FIG. 1, so these parts are shown by solid lines, parts behind (on the right side of) the pretensioner cover 61 as seen in FIG. 1 are shown by broken lines, and parts in front of (on the left side of) the second retainer 9 as seen in FIG. 1 are shown by two-dot chain lines.

Figure 10:
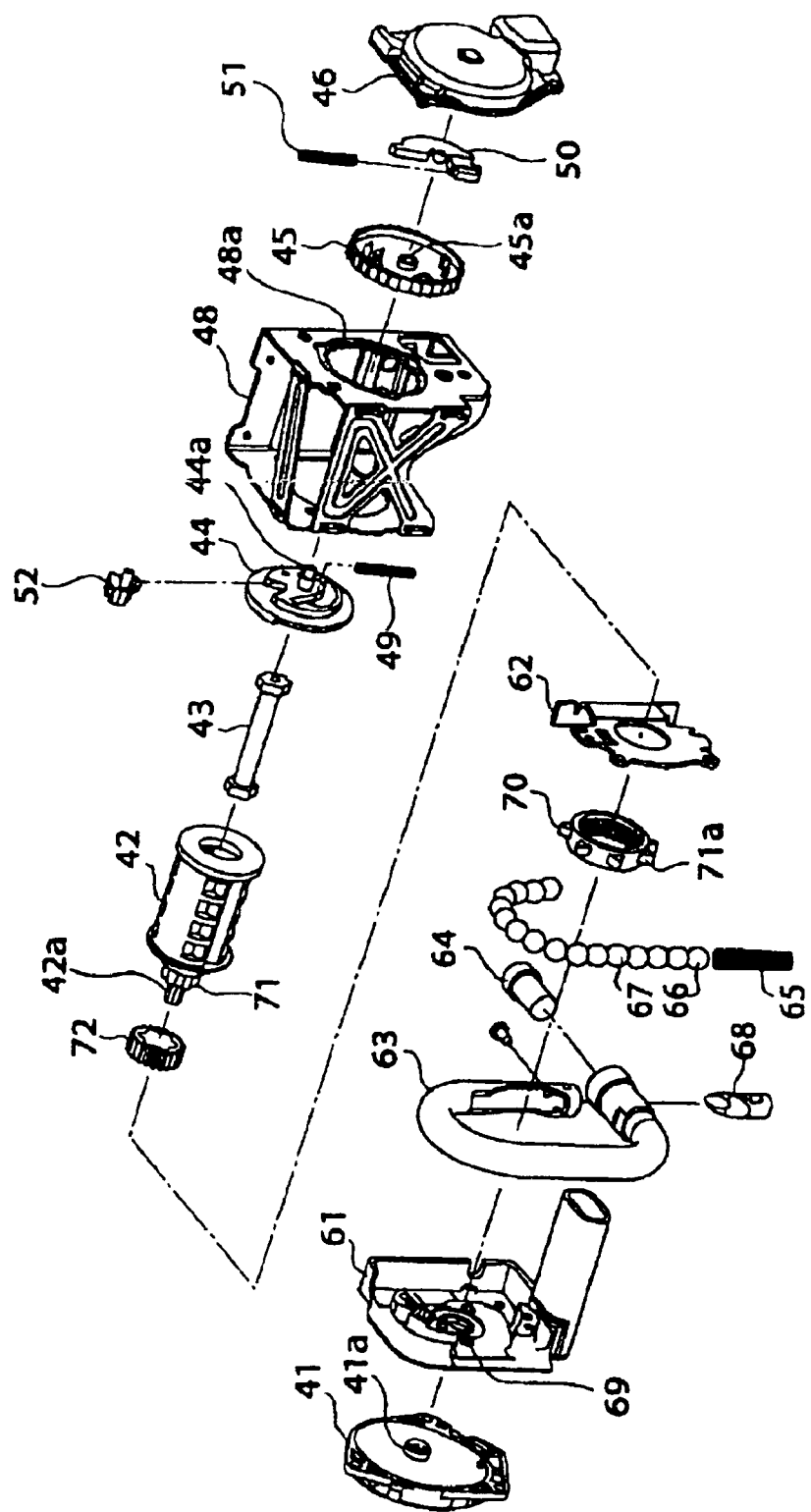
FIG. 10 is an illustration showing the outline of a conventional seat belt retractor.

In FIG. 3, the stopper 28 as a spring member is wound around a convex portion 32 and thus is fixed to the pretensioner cover 61. The stopper 28 has an end portion 28a which is bent as shown in FIG. 1 to penetrate an arc-shaped elongate hole 61 a formed in the pretensioner cover 61 and to abut one side of one of external teeth 71a of a ring gear 70 (the same as shown in FIG. 10). In this state, the stopper 28 is compressed against its biasing force because the external tooth 71a of the ring gear 70 prevents the stopper 28 from being freely expanding.

The release spring 29 is held at its end by the end portion 28a. The release spring 29 may be a plate spring and is fixed by and between convexes 30, 31 of the pretensioner cover 61. That is, the tip end of the bent end portion 28a of the stopper 28 abuts the external tooth 71a of the ring gear 70 as mentioned above, while the release spring 29 is caught on the proximal portion of the end portion 28a of the stopper 28. The release spring 29 is biased in the clockwise direction in FIG. 3 but is stopped in a state elastically curved against its biasing force because it is caught on the end portion 28a of the stopper 28.

As described with reference to FIG. 10, as the pyrotechnic pretensioner is activated, the ring gear 70 becomes free and is meshed with a pinion 72. From this state, balls 67 press and rotate the ring gear 70 so that the ring gear 70 rotates the spool 42 via the pinion 72.

During this, the ring gear 70 is rotated in the counter-clockwise direction in FIG. 3. Then, the external tooth 70a holding the end portion 28a of the stopper 28 is moved, whereby the end portion of the stopper 28 becomes free. Therefore, the stopper 28 expands because of its biasing force until the end portion 28a reaches the other end of the elongate hole 61a and is thus positioned as marked with 28' in FIG. 3. The end portion is displaced to a position marked with 28a' in FIG. 3 (even the parts between the second retainer 9 and the pretensioner cover 61, parts after moving from the initial position are shown by two-dot chain lines, such as 28' and 28a).

Then, the release spring 29 is released from the restriction of the stopper 28 and thus pivots in the clockwise direction in FIG. 3 because of its biasing force. As shown in FIG. 1, the clutch pawl 21 has a pin 21c which penetrates a hole 9a of the second retainer 9 to reach a position adjacent to the release spring 29.

As the release spring 29 pivots in the clockwise direction in FIG. 3, the release spring 29 collides with the pin 21c to press down the pin 21c. The force of pressing down the pin 21c is set to be larger than the force of the lever spring 22. Therefore, the clutch pawl 21 is rotated about the clutch pawl pin 25 in the clockwise direction in FIG. 3 to reach a position marked with 21' in FIG. 3 so that the end of the clutch pawl 21 is spaced apart from the ratchet tooth 18a of the internal gear 18 and the internal gear 18 becomes free to rotate. At this point, the release spring is at a position as marked with 29' and the pin of the clutch pawl is at a position as marked with 21c'.

As the internal gear 18 becomes free to rotate, the mechanical connection between the motor 8 and the spool 4 is cancelled as mentioned above, whereby the load of the motor does not exert effect on the "force limiter mechanism".

As mentioned above, the present invention can provide a seat belt retractor in which the function of the "force limiter mechanism" can be stably exhibited by mechanism means when a pyrotechnic pretensioner is activated.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims and equivalents thereof.

What is claimed is:

1. A seat belt retractor comprising:
   a motor for rotating a spool to wind up a seat belt;
   a power transmission switching mechanism which, in a connected state, allows the spool to rotate only in a seat belt winding direction and which, in a disconnected state, allows the spool to rotate in both directions;
   a force limiter mechanism which allows the spool to rotate in a seat belt withdrawing direction against a rotation limiting force when a force to rapidly withdraw the seat belt is applied; and
   a pyrotechnic pretensioner which forces to wind up the seat belt at the time of detection of a collision,
   wherein the power transmission switching mechanism is set into the disconnected state by the movement of a mechanical portion of the pyrotechnic pretensioner which moves when the pyrotechnic pretensioner is activated, thereby disconnecting the mechanical connection of the motor and the spool.

2. The seat belt retractor as claimed in claim 1, wherein the power transmission switching mechanism includes a ratchet wheel; and
   wherein the connected state and the disconnected state are switched depending on the presence or absence of engagement between a stopping member, which is driven by the rotational force of the motor in the seat belt winding direction, and the ratchet wheel; and
   wherein the stopping member is configured to be released from engagement with the ratchet wheel by the movement of the mechanical portion of the pyrotechnic pretensioner which moves when the pyrotechnic pretensioner is activated.

3. The seat belt retractor as claimed in claim 2, further comprising a control lever which is rotatable under the rotational torque of the motor; and
   wherein the control lever drives the stopping member to control the engagement between the stopping member and the ratchet wheel.

4. The seat belt retractor as claimed in claim 2, further comprising a reduction mechanism which reduces the speed of rotation of the motor and transmits the rotation of the motor to the spool; and
   wherein the reduction mechanism comprises a sun gear to which the rotation of the motor is transmitted, a ring-shaped internal gear which is rotatably disposed and has ratchet teeth on the external periphery thereof and inner teeth on the internal periphery thereof, a planetary gear which is meshed with both the sun gear and the internal gear, and a carrier which supports the planetary gear such that the planetary gear can rotate on the own axis and transmits the revolution of the planetary gear to the spool;
   wherein the power transmission switching mechanism further comprises a stopping lever which is adapted to pivot between the disengaging position where the stopping lever is not engaged with the ratchet teeth and the engaging position where the stopping lever can be engaged with the ratchet teeth;
   wherein when a control lever does not rotate, the stopping lever is set in the disengaging position to allow the internal gear to freely rotate, and when the control lever rotates, the stopping lever is set in the engaging position so as to engage the stopping lever with the ratchet teeth, thereby preventing the rotation of the internal gear, and
   wherein when the rotation of the internal gear is prevented, the power transmission switching mechanism is set in the connected state and when the rotation of the internal gear is free, the power transmission switching mechanism is set in the disconnected state.

5. The seat belt retractor as claimed in claim 3, further comprising a reduction mechanism which reduces the speed of rotation of the motor and transmits the rotation of the motor to the spool;
   wherein the reduction mechanism comprises a sun gear to which the rotation of the motor is transmitted, a ring-shaped internal gear which is rotatably disposed and has ratchet teeth on the external periphery thereof and inner teeth on the internal periphery thereof, a planetary gear which is meshed with both the sun gear and the internal gear, and a carrier which supports the planetary gear such that the planetary gear can rotate on the own axis and transmits the revolution of the planetary gear to the spool, and
   wherein the power transmission switching mechanism further comprises a stopping lever which is capable of pivoting between a disengaging position where the stopping lever is not engaged with the ratchet teeth and an engaging position where the stopping lever can be engaged with the ratchet teeth,
   wherein when the control lever does not rotate, the stopping lever is set in the disengaging position to allow the internal gear to freely rotate, and when the control lever rotates, the stopping lever is set in the engaging position so as to engage the stopping lever with the ratchet teeth, thereby preventing the rotation of the internal gear; and
   wherein when the rotation of the internal gear is prevented, the power transmission switching mechanism is set in the connected state and when the rotation of the internal gear is free, the power transmission switching mechanism is set in the disconnected state.

6. A seat belt retractor as claimed in claim 2, further comprising a reduction mechanism which reduces the speed of rotation of the motor and transmits the rotation of the motor to the spool;

wherein the reduction mechanism comprises a sun gear for transmitting the rotation of the motor to the spool, a ring-shaped internal gear which is rotatably disposed and has ratchet teeth on the external periphery thereof and inner teeth on the internal periphery thereof, a planetary gear which is meshed with both the sun gear and the internal gear, and a carrier which supports the planetary gear such that the planetary gear can rotate on the own axis and also revolves the planetary gear by the rotation of the motor; and wherein the power transmission switching mechanism further comprises a stopping lever which is capable of pivoting between the disengaging position where the stopping lever is not engaged with the ratchet teeth and the engaging position where the stopping lever can be engaged with the ratchet teeth;

wherein when a control lever does not rotate, the stopping lever is set in the disengaging position to allow the internal gear to freely rotate, and when the control lever rotates, the stopping lever is set in the engaging position so as to engage the stopping lever with the ratchet teeth, thereby preventing the rotation of the internal gear, and wherein when the rotation of the internal gear is free, the power transmission switching mechanism is set in the disconnected state and when the rotation of the internal gear is prevented, the power transmission switching mechanism is set in the connected state.

7. A seat belt retractor as claimed in claim 3, further comprising a reduction mechanism which reduces the speed of rotation of the motor and transmits the rotation of the motor to the spool;

wherein the reduction mechanism comprises a sun gear for transmitting the rotation of the motor to the spool, a ring-shaped internal gear which is rotatably disposed and has ratchet teeth on the external periphery thereof and inner teeth on the internal periphery thereof, a planetary gear which is meshed with both the sun gear and the internal gear, and a carrier which supports the planetary gear such that the planetary gear can rotate on the own axis and also revolves the planetary gear by the rotation of the motor, and wherein the power transmission switching mechanism further comprises a stopping lever which is capable of pivoting between the disengaging position where the stopping lever is not engaged with the ratchet teeth and the engaging position where the stopping lever can be engaged with the ratchet teeth, wherein when the control lever does not rotate, i.e. in the normal state, the stopping lever is set in the disengaging position to allow the internal gear to freely rotate, and when the control lever rotates, the stopping lever is set in the engaging position so as to engage the stopping lever with the ratchet teeth, thereby preventing the rotation of the internal gear, and wherein when the rotation of the internal gear is free, the power transmission switching mechanism is set in the disconnected state and when the rotation of the internal gear is prevented, the power transmission switching mechanism is set in the connected state.

8. A seat belt retractor as claimed in claim 2, wherein the engagement of the stopping member relative to the ratchet wheel is cancelled by directly or indirectly utilizing the movement of a rotational body; the rotational body being directly or indirectly subjected to the pyrotechnic power generated at the time of the operation of the pyrotechnic pretensioner and is thus rotated, and which then transmits its rotation to the spool.

9. A seat belt retractor as claimed in claim 8, wherein the pyrotechnic pretensioner has a pipe and balls arranged inside the pipe and transmits the pyrotechnic power to the balls, then transmits the force of the balls to external teeth of a wheel to rotate the wheel, and transmits the rotation of the wheel to the spool, wherein the seat belt retractor comprises a first elastic member which takes a form defined by the external teeth of the wheel in the normal state and changes its form because of its spring force when the wheel is rotated, and a second elastic member which takes a form defined by the first elastic member in the normal state and changes its form because of its spring force when the first elastic member changes its form, wherein the engagement of the stopping member relative to the ratchet wheel is cancelled by the biasing force of the second elastic member when changing its form.

* * * * *